(12) United States Patent
Lindqvist et al.

(10) Patent No.: US 8,710,845 B2
(45) Date of Patent: Apr. 29, 2014

(54) ELECTROMAGNETIC SENSOR CABLE AND ELECTRICAL CONFIGURATION THEREFOR

(75) Inventors: Ulf Peter Lindqvist, Segeltorp (SE);
Robert Andras Juhasz, Hägersten (SE);
Gustav Göran Mattias Südow, Solna (SE)

(73) Assignee: PGS Geophysical AS, Lysaker (NO)

( * ) Notice: Subject to any disclaimer, the term of this patent is extended or adjusted under 35 U.S.C. 154(b) by 317 days.

(21) Appl. No.: 13/236,158

(22) Filed: Sep. 19, 2011

(65) Prior Publication Data

US 2013/0069657 A1    Mar. 21, 2013

(51) Int. Cl.
*G01V 3/00*    (2006.01)

(52) U.S. Cl.
USPC .......................................... 324/365; 324/347

(58) Field of Classification Search
USPC ................................. 324/365, 347
See application file for complete search history.

(56) References Cited

U.S. PATENT DOCUMENTS

| | | | |
|---|---|---|---|
| 5,627,798 A | 5/1997 | Siems et al. | |
| 7,139,217 B2 | 11/2006 | Scott | |
| 7,446,535 B1 | 11/2008 | Tenghamn et al. | |
| 7,602,191 B2 | 10/2009 | Davidsson | |
| 7,671,598 B2 | 3/2010 | Ronaess et al. | |
| 7,737,698 B2 | 6/2010 | Tenghamn et al. | |
| 7,834,632 B2 | 11/2010 | Tenghamn et al. | |
| 2010/0045296 A1 | 2/2010 | Tenghamn | |

FOREIGN PATENT DOCUMENTS

| | | |
|---|---|---|
| GB | 2436709 A | 3/2007 |
| GB | 2479967 A | 2/2011 |

OTHER PUBLICATIONS

United Kingdom Search Report for Application No. GB1215611.3, dated Dec 31, 2012.

*Primary Examiner* — Reena Aurora (57) ABSTRACT

An electromagnetic sensor cable has components including a first sensor cable segment having a plurality of spaced apart electrodes on the first sensor cable segment an electrical conductors coupled to the electrodes such that at least one of the electrodes is electrically connectible at at least one longitudinal end of the first sensor cable segment. The sensor cable includes a second sensor cable segment configured substantially the same as the first sensor cable segment. A first signal processing and configuration module has signal processing circuitry configured to perform at least one of measuring voltages across selected pairs of electrodes, and communicating signals representative of voltages measured across selected pairs of electrodes. The cable components are each configured to connect at the lateral ends one to another.

28 Claims, 5 Drawing Sheets

ELECTROMAGNETIC SENSOR CABLE AND ELECTRICAL CONFIGURATION THEREFOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates generally to the field of marine electromagnetic surveying of subsurface rock formations. More specifically, the invention relates to electrical configurations for electromagnetic sensor cables used in such surveying.

Marine electromagnetic geophysical surveying is used to infer spatial distribution of electrical conductivity of rock formations below the bottom of a body of water such as a lake or ocean. The spatial distribution of conductivity is used to assist determining presence of hydrocarbon bearing rock formations in the subsurface. One type of such surveying generally includes inducing a time varying electromagnetic ("EM") field in the subsurface formations and measuring one or more parameters related to a response of the subsurface rock formations to the induced EM field.

Devices for inducing such EM fields are generally referred to as "sources" or "transmitters" and include, among other devices, spaced apart electrodes disposed along or at the end of a cable. The cable may be towed by a vessel in the body of water. Time varying electric current is imparted across the electrodes, generally from a power source located on the vessel, to induce a time varying EM field in the water and subsequently in the subsurface formations. The electrodes may be suspended at a selected depth in the water by the use of floatation devices such as buoys, or the cable itself may be neutrally or otherwise buoyant.

The response of the subsurface formations below the water bottom may be detected by various sensors on long cables or "streamers" towed in the water behind the survey vessel or a different vessel. In some examples, the streamer includes pairs of spaced apart electrodes to detect an electric field component of the EM field response.

The direct EM field strength decreases rapidly with respect to distance from the EM field source in an EM measurement system. The corresponding EM field modulated by the subsurface rock formations decreases even more rapidly with respect to distance from the transmitter or field source. When electrode pairs are used to detect the electric field component of the EM field, such pairs need to have a short separation between the elements of the pair when the pair is disposed close to the source in order to not saturate an input amplifier typically associated with the electrode pair. At long distances ("offsets") from the source the electrodes in respective pairs need to be separated by a greater distance in order to be able to measure the weaker electric field component.

Marine streamers are typically assembled from segments each about 75 meters length, and may include a number of such interconnected segments such that the total streamer length may be several kilometers. "Short" electrode pairs can typically be fitted within a standard marine geophysical streamer segment length of 75 in, while longer electrode pair lengths can be many times longer than the length of a typical streamer segment. The spacing requirements for near offset and long offset electrode pairs are thus contradictory with respect to designing a single streamer wiring configuration.

What is needed is a wiring configuration that can be used in a marine sensor streamer having selectable spacing between respective pairs of electrodes.

DETAILED DESCRIPTION

Figure 1:
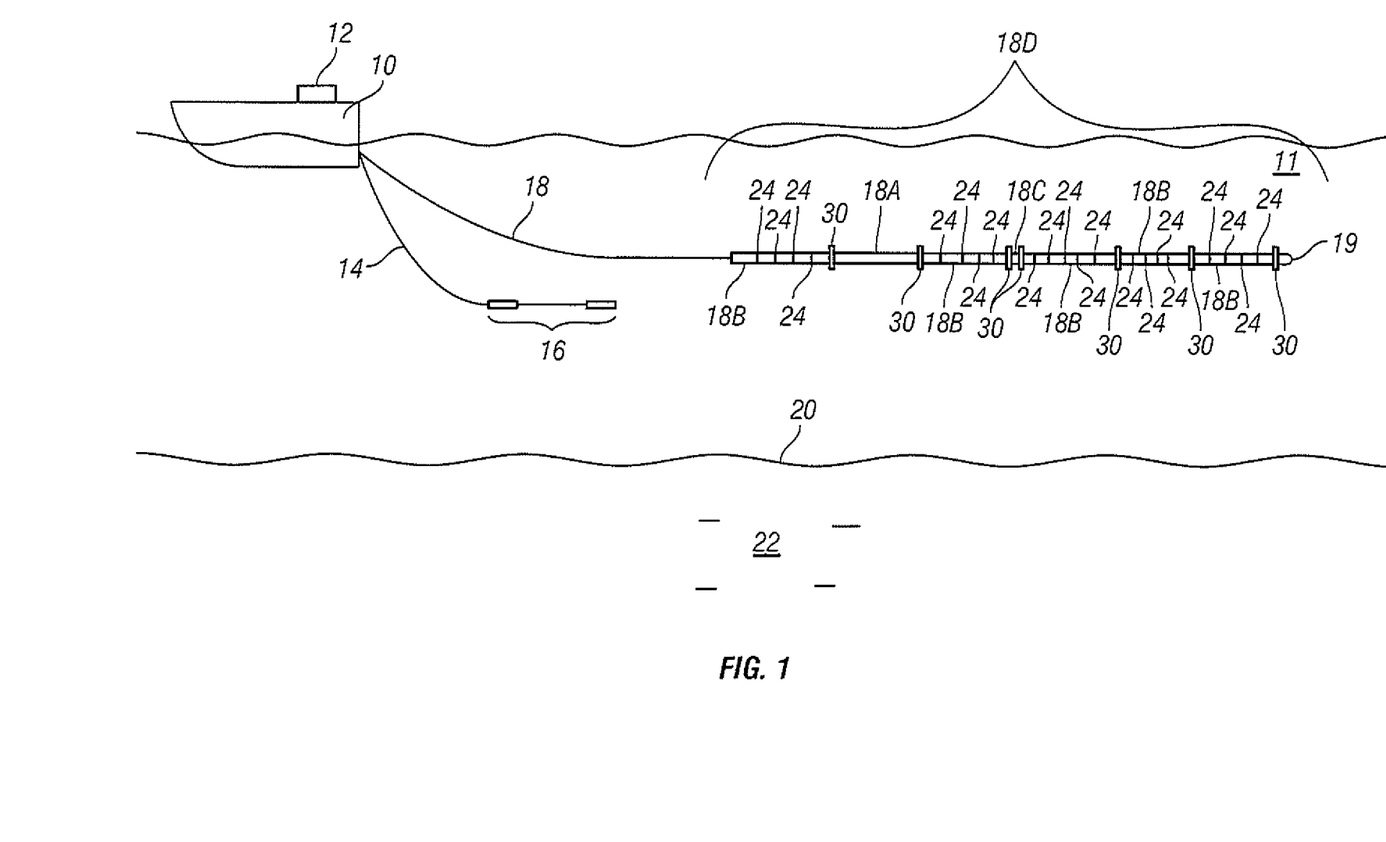
FIG. 1 shows an example embodiment of an electromagnetic survey system including one possible embodiment of an electromagnetic sensor cable according to the invention.

An example embodiment of an electromagnetic survey system including one possible embodiment of an electromagnetic sensor cable according to the invention is shown schematically in FIG. 1. The survey system may include a survey vessel 10 that moves along the surface of a body of water 11 such as a lake or ocean. The vessel 10 may include equipment thereon, shown generally at 12 and referred to for convenience as a "recording system." The recording system 12 may include (none of which is shown separately for clarity of the illustration) equipment for navigating the vessel 10, for energizing an electromagnetic field source (explained below) at selected times and recording signals detected by one or more electromagnetic sensors or receivers (explained below).

In the present embodiment, the electromagnetic field source may be a bipole electrode 16 disposed at the aft (with respect to towing direction) end of a tow cable 14. An electric current source (not shown) in the recording system 12 may energize the bipole electrode 16 at selected times to introduce a time varying electromagnetic field in the water 11 and in the formations 22 below the water bottom 20. Signals modulated by the formations 22, among other signals may be detected by electromagnetic sensors or receivers disposed on one or more electromagnetic sensor cables 18D.

In the present embodiment, the electromagnetic sensor cable 18D includes several cable components, such as sensor cable segments 18B, which each may each include a plurality of longitudinally spaced apart electrodes 24. Selected pairs of the electrodes 24 may be electrically coupled across the input of a voltage measuring circuit (further explained below) so that the amplitude of the electric field component of the induced electromagnetic field can be measured at a plurality of longitudinal distances ("offsets") from the electromagnetic field source (bipole electrode 16). As will be further explained, the two electrodes making up the selected pair may be on the same sensor cable segment 18B, or they each may reside on a different sensor cable segment 18B. The sensor cables segments 18B may be combined with other cable components, to be further explained below, to make an electromagnetic sensor cable 18D.

In some embodiments, the electromagnetic survey system may include multiple electromagnetic sensor cables 18D, laterally spaced apart, and generally parallel to one another. Often, the electromagnetic sensor cables 18D will be towed by vessel 10. However, one or more electromagnetic sensor cables 18D may be towed by another survey vessel (not shown). In some embodiments, one or more electromagnetic sensor cable 18D may be located on the water bottom 20, rather than towed by vessel 10 or another vessel (not shown).

An example embodiment of an electromagnetic sensor cable 18D may include a tow cable 18, configured to couple to the vessel 10 and tow the cable components of the electromagnetic sensor cable 18D. The cable components of the electromagnetic sensor cable 18D may include one or more sensor cable segments 18B as explained above, and one or more through wire cable segments 18A. A through wire cable segment 18A is essentially a sensor cable segment 18B without electrodes, having only through wiring extending from one longitudinal end to the other. In some embodiments, a sensor cable segment 18B may be used to function as a through wire cable segment 18A, wherein electrical connections to the electrodes are disregarded (e.g., not electrically connected to the rest of the system). Electromagnetic sensor cable 18D also may include one or more signal processing and configuration modules 18C. Such signal processing and configuration modules 18C may include signal processing circuitry (explained further below) for measuring voltages across selected pairs of the electrodes 24 and communicating signals representative of the measured voltages to the recording system 12. The aft (with respect to towing direction) end of the electromagnetic sensor cable 18D may be terminated with a plug 19 to exclude water from entering electrical/mechanical terminations 30 that may be used to couple the various streamer cable segments (e.g., sensor cable segments 18B, through wire cable segments 18A and signal processing and configuration modules 18C).

As will be appreciated by those skilled in the art, the direct electric field amplitude decreases rapidly (on the order of $1/r^2$-$1/r^3$) from a current bipole with respect to offset distance, r, from the current bipole (e.g., bipole electrodes 16) in an EM measurement system. The corresponding modulated electromagnetic field amplitude decreases even more rapidly (on the order of $1/r^5$-$1/r^6$) with respect to offset from the electromagnetic field source position. Electrode pairs used for sensing the electromagnetic field, that is, those of the electrodes 24 coupled across the input of a voltage measuring circuit, generally are required to have shorter separation between them when they are disposed close to the electromagnetic field source (e.g., bipole electrodes 16) in order to avoid saturating the voltage measuring circuit (described below). At longer offsets from the electromagnetic field source, the electrodes in respective electrode sensing pairs generally are required to be spaced further apart from each other in order to be able to detect a measurable voltage in the presence of the relatively weak modulated electric field. Shorter electrode pair distances can be obtained using only electrodes disposed within a "standard" streamer cable segment length of about 75 meters (e.g., one of the sensor cable segments 18B), while the longer spaced electrode pairs can be spaced at such distances as to require electrical interconnection of electrodes across several sensor cable segments 18B, if the electromagnetic sensor cable 18D is assembled from segments. Various embodiments of an electromagnetic sensor cable 18D according to the invention may provide a high degree of flexibility in configuring an electromagnetic sensor cable 18D to be able to measure near and far offset electromagnetic field components while using streamer cable segments and auxiliary cable components made in only a limited number of configurations. For example, one possible configuration of an electromagnetic sensor cable would align the cable components as follows:

BCBCBCBCB . . . BACABACABACAB . . . BAACAA-BAACAABAACAAB . . .

wherein "B" indicates sensor cable segments 18B, "C" indicates signal processing and configuration modules 18C, and "A" indicates through wire cable segments 18A.

Figure 2A:
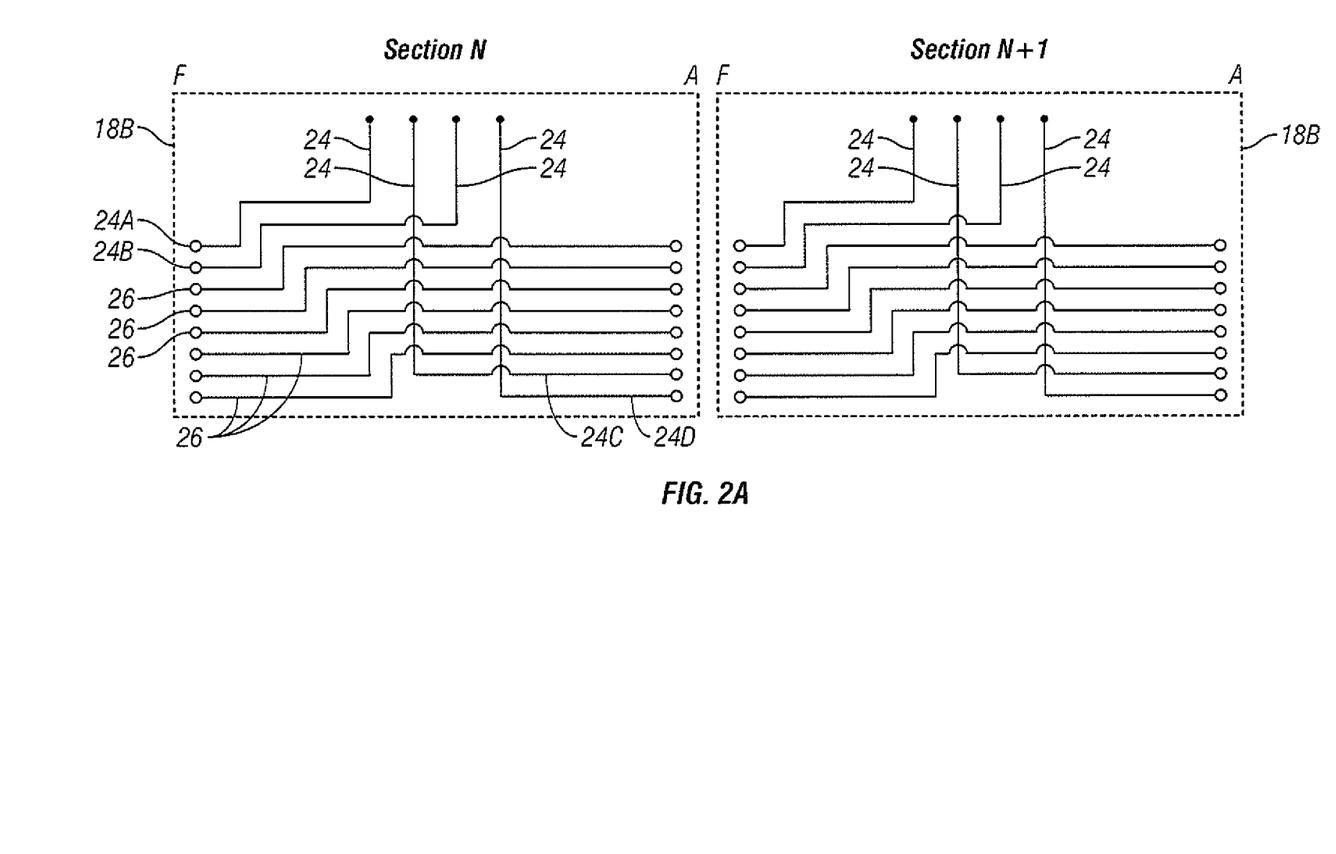
FIG. 2A shows an example embodiment of sensor cable segments including electrodes and through wiring.

An example embodiment of two of the sensor cable segments 18B is shown schematically in FIG. 2. The sensor cable segments 18B, two of which are shown adjacent to each other, may include a plurality of electrodes 24 disposed at spaced apart locations along the exterior of the sensor cable segments 18B. The internal structure of the sensor cable segments 18B and the electrodes 24 may be in any suitable form for towing in the water (11 in FIG. 1) or disposition on the water bottom (20 in FIG. 1). In the present embodiment, a selected number, e.g., two, of the electrodes 24 may be electrically wired inside the sensor cable segments 18B to have electrical connection capability (e.g., electrical connections 24A, 24B) at the forward (with respect to towing direction) end F of the sensor cable segment 18B-Section N. The same or a different number, e.g., two, other of the electrodes 24 may be electrically wired inside the sensor cable segments 18B to have electrical connection capability (e.g., electrical connections 24C, 24D) at the aft (with respect to towing direction) end A of the sensor cable segment 18B-Section N+1. A plurality of through wires 26 may extend inside the sensor cable segments 18B from the forward end F to the aft end A to have available electrical connection either to other electrodes in adjacent sensor cables segments 18B, to through wires in a through wire cable segments (explained with reference to 18A in FIG. 3) or to various circuits in one or more of the signal processing and configuration modules (18C in FIG. 4).

In the present example embodiment, there may be 4 electrodes per sensor cable segment 18B as shown herein, although the number of electrodes on each sensor cable segment 18B is not a limit on the scope of the present invention. Flexibility in changing the offset and electrode spacing for any electrode pair (wherein "pair" refers to two electrodes coupled across the input of a voltage measuring circuit) may be implemented by wiring the sensor cable segments 18B together with a set of through wires 26 in a shifting pattern as shown in FIG. 2 so that electrical connection to electrodes in adjacent streamer cables segments can be made.

In various embodiment, by adding a number, M, of electrical conductor wires that go straight through the sensor cable segment 18B, a number, 2M/Q, of additional sensor cable segments 18B can be connected in series without any additional module or other interconnection between the connected sensor cable segments 18B. In the foregoing, Q represents the number of electrodes on each sensor cable segment 18B. In the example embodiment in FIG. 2, six through wires 26 are added to the wiring scheme allowing for up to four sensor cable segments 18B to be connected in series without any other type of interconnection between adjacent sensor cable segments 18B. Other numbers of electrodes on each sensor cable segment 18B and other numbers of through wires 26 may provide different numbers of directly connectible sensor cable segments 18B.

An example set of configurations may be as follows. The number of electrodes may be represented by Q (where Q is an even number); the maximum number of sections to be connected without any form of interconnecting module may be represented by N; the number of wires straight through may be represented by M; and the total number of wires in each sensor cable may be represented by W, then:

$$W=(Q/2+M)=(Q/2+Q\cdot(N-1)/2),$$

and a possible wiring scheme is (q represents a connection to an electrode, m represents a connection to through wire):

| Pin | Connector 1 | Connector 2 |
|---|---|---|
| 1 | q(1) | m(1) |
| 2 | q(2) | m(2) |

-continued

| Pin | Connector 1 | Connector 2 |
|---|---|---|
| Q/2 | q(Q/2) | m(Q/2) |
| Q/2 + 1 | m(l) | m(Q/2 + 1) |
| M + Q/2 − 1 | m(M) | q(Q/2 + 1) |
| M + Q/2 | m(M) | q(Q) |

The principal feature of the above wiring scheme is that electrodes can be electrically connected from each longitudinal end of the through wire cable segment 18A, with up to N sensor cable segments 18B to form a balanced pair, i.e. the electrode spacings in any pair are equal. The number of balanced pairs available to select from is then NQ/2.

Figure 2B:
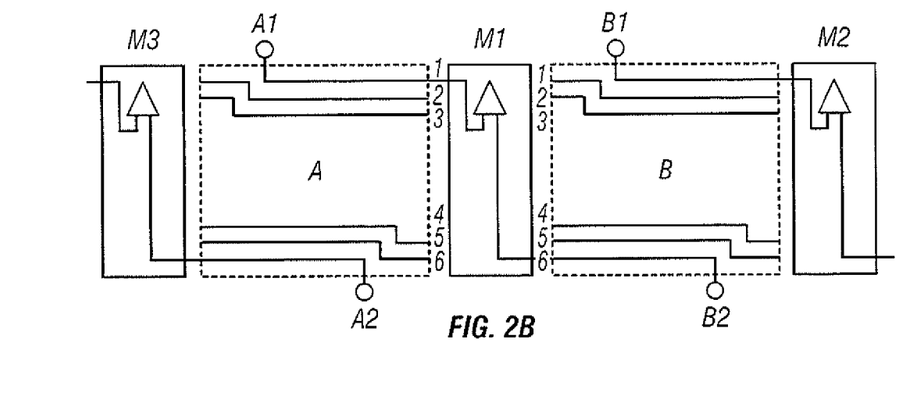
FIG. 2B shows another example embodiment of sensor cable segments including electrodes and through wiring.

Another feature of the wiring scheme is to provide a connector "pinout" of connected electrode wires and through wires in the connector so that a single section configuration can be used to access different electrodes, depending on how many sections are connected together between each acquisition module. Pinout is intended to mean that each connector pin in the streamer section connector is characterized by connection to either an electrode in one streamer section or a dedicated through wire intended for connecting to a specific electrode in an adjacent streamer section. FIG. 2B illustrates one example embodiment of the foregoing concept, wherein the cable sections are shown at A and B, and the modules are shown at M3, M1 and M2.

In the example embodiment shown in FIG. 2B, only one single cable section type may be used. If one cable section (A, B) is present between each module (M1, M2, M3) as shown in FIG. 2B, the electrodes A1 and B2 are electrically connected to the adjacent module, e.g., M1 (and B1 available in adjacent modules M2, and A2 in M3).

Figure 2C:
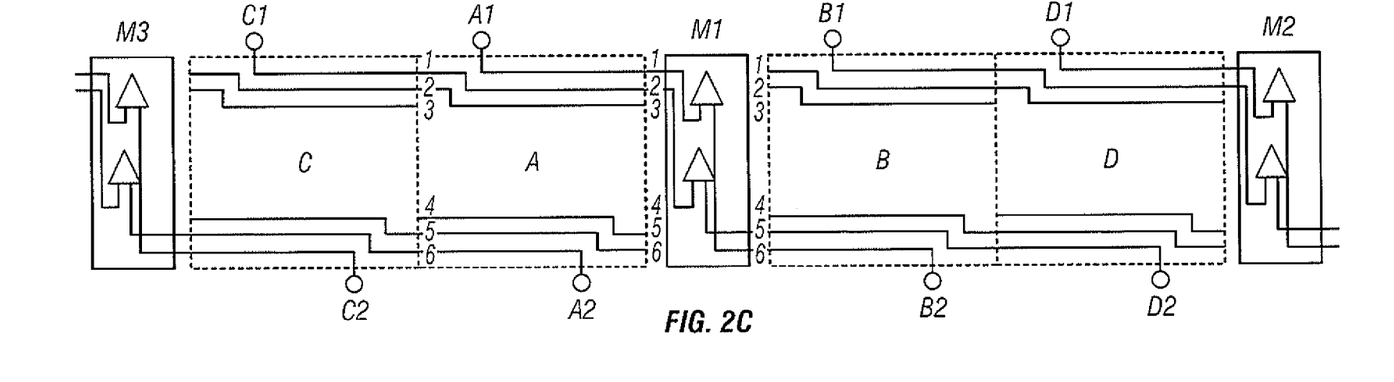
FIG. 2C shows another example embodiment of sensor cable segments including electrodes and through wiring.

As shown in FIG. 2C, if two cable sections are connected between successive modules, more electrodes will be available for electrical connection to the respective modules. In FIG. 2C, module M1 has electrodes A1, C1, B2 and D2 electrically connected thereto. Electrodes B1 and D1 may be connected to module M2. Electrodes A2 and C2 may be connected to module M3.

Thus the wire rotation scheme in the connector allows for flexible electrode and module wiring depending on how many cable sections are present between each module. The wire rotation scheme can be extended to support more than one electrode in each direction (up, down) in the section. The maximum number of sections between successive modules using such scheme is equal the number of through wires plus one. Such number is three in the example shown in FIGS. 2B and 2C.

In both FIGS. 2B and 2C, a vertical position corresponds to a certain pin number in the connector. For example, pins 1 through 6 in each connector are assumed to be present between cable sections and modules.

Figure 3:
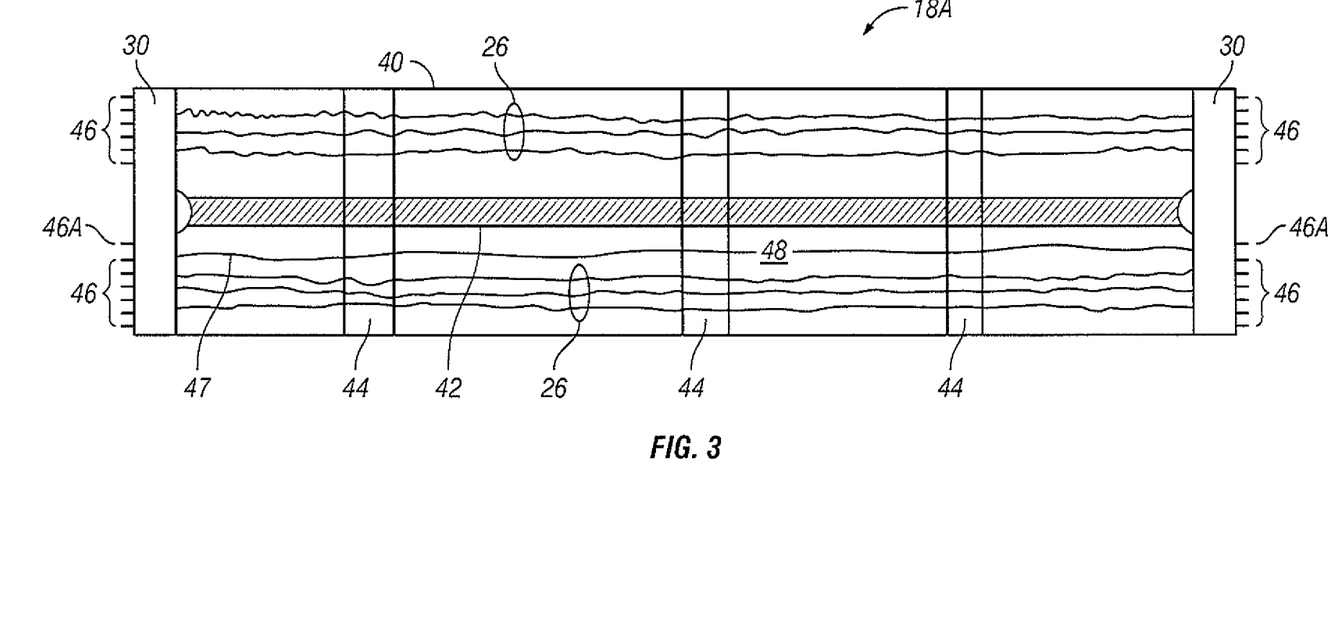
FIG. 3 shows an example embodiment of a through wire cable segment.

As previously explained, it is sometimes necessary to increase the offset and/or the spacing between electrodes in a pair in order to measure components of the electromagnetic field at certain distances from the electromagnetic field source. To increase the spacing between electrodes in certain parts of an electromagnetic sensor cable, through wire cable segments may be used. An example embodiment of a through wire cable segment 18A is shown in FIG. 3. The through wire cable segment 18A may include an exterior plastic jacket 40 such as may be made from polyurethane or similar material. Each longitudinal end of the through wire cable segment 18A may include a mechanical and electrical/mechanical termination 30 of types well known in the art for joining streamer cable segments. Such electrical/mechanical terminations 30 may sealingly engage the interior surface of the jacket 40 and provide mechanical coupling to at least one strength member 42 that extends the length of the through wire cable segment 18A and may communicate axial towing load along the electromagnetic sensor cable (18D in FIG. 1). For example, the strength member 42 may be made from natural or synthetic fiber rope, using any such material known in the art for making marine streamer strength members. Each electrical/mechanical termination 30 may include a plurality of electrical connectors 46 and/or optical connectors 46A. In the case of electrical connectors 46, there may be one connector for each through wire 26. In the present embodiment, the through wires 26 may be in the form of twisted pairs to reduce cross talk and other electrical interference with signals imparted to the through wires 26. The through wire cable segment 18A may also include one or more optical fibers 47 extending end to end inside the jacket 40 and terminated with suitable optical connectors 46A forming part of the electrical/mechanical termination 30. The interior of the jacket 40 may include one or more buoyancy spacers 44 disposed at selected longitudinal positions. The buoyancy spacers may be made, for example, from foamed polypropylene and may provide the through wire cable segment 18A with a selected overall buoyancy. Void spaces in the interior of the jacket may be filled with a buoyancy void fill (BVF) material 48 of any type known to be used, for example, in the making of seismic streamers. In one embodiment, the BVF 48 may in introduced into the interior of the jacket in liquid form and may then undergo state change to a gel. The foregoing mechanical components, including the jacket 40, BVF 48, buoyancy spacers 44, strength member 42 and electrical/mechanical termination 30 may also be used in various embodiments of the sensor cable segment (explained above with reference to 18B in FIG. 2). The foregoing were omitted from FIG. 2 merely for clarity of the illustration and not to limit the structures for the electromagnetic sensor cable consistent with the scope of the present invention.

Figure 4:
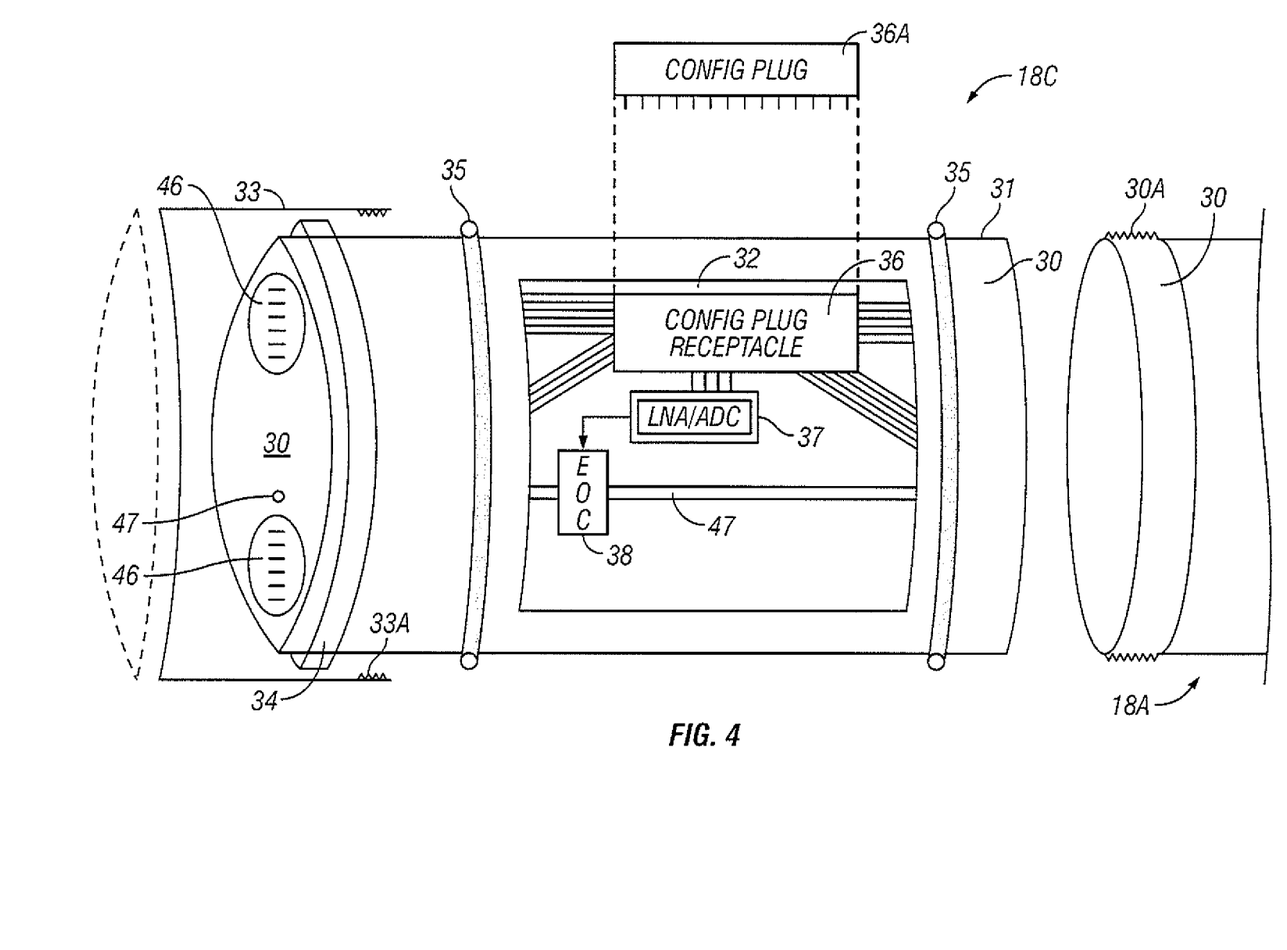
FIG. 4 shows an example embodiment of a configuration module.

An example embodiment of a signal processing and configuration module 18C is shown in cut away view in FIG. 4. The signal processing and configuration module 18C may be enclosed in a pressure resistant housing 31 such as may be made from high strength plastic or non-magnetic steel alloy. The housing 31 may be substantially cylindrically shaped, and may include electrical/mechanical terminations 30 configured to couple to the terminations on either of the sensor cable segment (18B in FIG. 1) or through wire cable segment (18A in FIG. 1). The embodiment shown in FIG. 4 may provide for such connection between cable segments by including a flange 34 on the exterior of the housing which engages a mating flange (not shown) in a connecting sleeve 33. The connecting sleeve 33 may be substantially cylindrical in shape, and when moved along the exterior of the housing 31 may engage o-rings 35 or similar seal elements positioned longitudinally on either side of an opening 32 in the wall of the housing 31. Thus, with the sleeve 33 removed, the opening 32 is accessible. With the sleeve 33 in the connected position, for example, by engaging internal threads 33A on the end of the sleeve 33 with mating threads 30A on the adjacent electrical/mechanical termination 30, the interior of the housing 31 is sealed from water intrusion by the sleeve 33.

The interior of the housing 31 may include circuits for selective interconnection of through wires (e.g., 26 in FIGS. 2 and 3) and electrical connections (e.g., 24A, 24B, 24C, 24D in FIG. 2) of electrodes (24 in FIG. 2) on the sensor cable segment (18B in FIG. 2) either to through wires or to voltage detecting/measuring circuitry. In the present embodiment, each of the electrical connections 46 at each electrical/mechanical termination 30 may be electrically connected, such as by twisted pairs of wires, to a corresponding electrical contact on a configuration plug receptacle 36. Other electrical contacts on the configuration plug receptacle 36 may connect to the input terminals of one or more low noise amplifier/digitizer (LNA/ADC) combinations 37. Output of the LNA/ADC combination(s) 37 may be coupled to an electrical to optical signal converter (EOC) 38 and thence to the one or more optical fibers 47 for communication of digitized voltage signals along the streamer and, if required, to the recording system (12 in FIG. 1). Power for the LNA/ADC combinations 37 and EOC 38 may be provided by a battery (not shown) inside the signal processing and configuration module 18C. Such battery may be rechargeable while the streamer is deployed by using a module charging circuit such as one described in U.S. Pat. No. 7,602,191 issued to Davidsson, incorporated herein by reference.

Referring back to FIG. 1, the particular electrodes 24 on any sensor cable segment 18B that are connected to through wires or to the input of the LNA/ADC combination (37 in FIG. 4) may be selected prior to deployment of the electromagnetic sensor cable 18D by inserting a suitably wired configuration plug (36A in FIG. 4) into the receptacle (36 in FIG. 4). Thus, in combination, suitable numbers of sensor cable segments 18B, through wire cable segments 18A, and suitably configured signal processing and configuration modules 18C may provide the system user with a large number of options as to electrode spacing and offset while manufacturing only three basic cable components. It should be appreciated that the signal processing and configuration module 18C may be used to select electrodes 24 on sensor cable segments 18B located both distal (away from the vessel 10) and forward (towards the vessel 10) of signal processing and configuration module 18C along the electromagnetic sensor cable 18D.

For example, in the embodiment explained with reference to FIG. 2, a number N of sensor cable segments each having a number Q of electrodes thereon and a number M of through wires can be connected in series. One of the signal processing and configuration modules 18C may be located at the distal end (away from the vessel 10) of the N interconnected sensor cable segments 18B. The configuration plug 36A may be arranged so that all electrical connection to the electrodes extending in a direction away from the vessel 10 may be reversed in the signal processing and configuration module 18C, thus making all electrical connections to each electrode available at the forward end (F in FIG. 2) of the forwardmost (toward the vessel 10) interconnected sensor cable segment 18B. Other configurations of sensor cable segments 18B, through wire cable segments 18A, and signal processing and configuration modules 18C will occur to those skilled in the art in order to provide a wide range of electrode spacings and offsets along the assembled electromagnetic sensor cable (18D in FIG. 1).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electromagnetic sensor cable, comprising cable components:
    a first sensor cable segment comprising:
        a plurality of spaced apart electrodes on the first sensor cable segment; and
        electrical conductors in the first sensor cable segment coupled to the electrodes such that at least one of the electrodes is electrically connectible at at least one longitudinal end of the first sensor cable segment,
    a second sensor cable segment comprising:
        a plurality of spaced apart electrodes on the second sensor cable segment; and
        electrical conductors in the second sensor cable segment coupled to the electrodes such that at least one of the electrodes is electrically connectible at at least one longitudinal end of the second sensor cable segment, and
    a first signal processing and configuration module having signal processing circuitry configured to perform at least one of: measuring voltages across selected pairs of electrodes, and communicating signals representative of voltages measured across selected pairs of electrodes,
    wherein the cable components are each configured to connect at the lateral ends one to another.

2. The electromagnetic sensor cable of claim 1, wherein at least one of the sensor cable segments further comprises a through wire extending from one longitudinal end to the other longitudinal end of the sensor cable segment without connection to an electrode.

3. The electromagnetic sensor cable of claim 1 further comprising cable components:
    a first through wire cable segment having electrical conductors extending from one longitudinal end to the other.

4. The electromagnetic sensor cable of claim 3, further comprising at least one additional cable component selected from the group consisting of:
    a sensor cable segment configured substantially the same as the first sensor cable segment,
    a through wire cable segment configured substantially the same as the first through wire cable segment, and
    a signal processing and configuration module configured substantially the same as the first signal processing and configuration module.

5. The electromagnetic sensor cable of claim 4, wherein the cable components are connected at lateral ends such that the number of cable components between sensor cable segments progressively increases from a first end of the electromagnetic sensor cable to a second end of the electromagnetic sensor cable.

6. The electromagnetic sensor cable of claim 3, wherein the connection between cable components provides electrical connectivity between the electrical conductors of the sensor cable segments, the electrical conductors of the first through wire cable segment, and the signal processing circuitry of the first signal processing and configuration module.

7. The electromagnetic sensor cable of claim 3 wherein the first through wire cable segment provides electrical connections between a first cable component connected at a first lateral end of the first through wire cable segment and a second cable component connected at a second lateral end of the first through wire cable segment such that the electrical pathways are the same as if the first and second cable component were directly connected to each other.

8. The electromagnetic sensor cable of claim 3 wherein:
    the first sensor cable segment further comprises a through wire extending from one longitudinal end to the other longitudinal end of the first sensor cable segment without connection to an electrode; and
    the first through wire cable segment is configured substantially the same as the first sensor cable segment, but the electrical conductors coupled to the electrodes of the first through wire cable segment are disregarded.

9. The electromagnetic sensor cable of claim 1, wherein the signal processing and configuration module has a configuration plug which is electrically configurable to electrically connect at least two electrodes to the signal processing circuitry.

10. The electromagnetic sensor cable of claim 1 wherein the signal processing and configuration module includes a low noise amplifier in signal communication with the configuration plug, an analog to digital converter and an electrical to optical converter in electrical connection to the low noise amplifier.

11. The electromagnetic sensor cable of claim 1 further comprising a tow cable configured to connect to a survey vessel.

12. The electromagnetic sensor cable of claim 1 further comprising a connector pinout of connected electrode wires and through wires in connectors configured to connect sensor cable segments and/or signal processing modules so that a single sensor cable section configuration is usable to access different electrodes thereon depending on a number of sensor cable sections connected together between successive signal processing and acquisition modules.

13. An electromagnetic sensor cable, comprising cable components:
    sensor cable segments directly connected at lateral ends to one another, each sensor cable segment comprising:
    spaced apart electrodes on the sensor cable segment;
    through wires extending from one longitudinal end to the other longitudinal end of the sensor cable segment without connection to an electrode, and
    electrical conductors in the sensor cable segment coupled to the electrodes such that at least one of the electrodes is electrically connectible at at least one longitudinal end of the sensor cable segment,
    wherein the number of the cable components are related to each other by the relationship:

$$W=(Q/2+M)=(Q/2+Q\cdot(N-1)/2);$$

wherein N is the number of the sensor cable segments,
    wherein Q is the number of the spaced apart electrodes,
    wherein M is the number of the through wires, and
    wherein W-M is the number of the electrical conductors.

14. The electromagnetic sensor cable of claim 13 further comprising at least one additional cable component selected from the group consisting of:
    a through wire cable segment having electrical conductors extending from one longitudinal end to the other, and
    a signal processing and configuration module having signal processing circuitry configured to perform at least one of measuring voltages across selected pairs of electrodes, and communicating signals representative of voltages measured across selected pairs of electrodes,
    wherein the cable components are each configured to connect at the lateral ends one to another.

15. An electromagnetic survey system comprising:
    a survey vessel;
    a tow cable connected at a first end to the survey vessel;
    an electromagnetic sensor cable comprising cable components:
        a first sensor cable segment comprising:
            a plurality of spaced apart electrodes on the first sensor cable segment; and
            electrical conductors in the first sensor cable segment coupled to the electrodes such that at least one of the electrodes is electrically connectable at at least one longitudinal end of the first sensor cable segment,
        a second sensor cable segment comprising:
            a plurality of spaced apart electrodes on the second sensor cable segment; and
            electrical conductors in the second sensor cable segment coupled to the electrodes such that at least one of the electrodes is electrically connectible at at least one longitudinal end of the second sensor cable segment, and
        a first signal processing and configuration module having signal processing circuitry configured to perform at least one of: measuring voltages across selected pairs of electrodes, and communicating signals representative of voltages across selected pairs of electrodes,
    wherein the cable components are each configured to connect at the lateral ends one to another, and to a second end of the tow cable.

16. The electromagnetic survey system of claim 15, wherein at least one of the sensor cable segments further comprises a through wire extending from one longitudinal end to the other longitudinal end of the sensor cable segment without connection to an electrode.

17. The electromagnetic survey system of claim 15, wherein the electromagnetic sensor cable further comprising cable components:
    a first through wire cable segment having electrical conductors extending from one longitudinal end to the other.

18. An method of conducting an electromagnetic survey comprising:
    towing an electromagnetic sensor cable through a body of water with a survey vessel, wherein a tow cable is connected at a first end to the survey vessel, and the electromagnetic sensor cable comprises cable components:
        a first sensor cable segment comprising:
            a plurality of spaced apart electrodes on the first sensor cable segment, and
            electrical conductors in the first sensor cable segment coupled to the electrodes such that at least one of the electrodes is electrically connectible at at least one longitudinal end of the first sensor cable segment,
        a second sensor cable segment comprising:
            a plurality of spaced apart electrodes on the second sensor cable segment, and
            electrical conductors in the second sensor cable segment coupled to the electrodes such that at least one of the electrodes is electrically connectible at at least one longitudinal end of the second sensor cable segment, and
        a first signal processing and configuration module having signal processing circuitry configured to perform at least one of measuring voltages across selected pairs of electrodes, and communicating signals representative of voltages across selected pairs of electrodes,
    wherein the cable components are each configured to connect at the lateral ends one to another, and to a second end of the tow cable.

19. The method of claim 18, wherein at least one of the sensor cable segments further comprises a through wire extending from one longitudinal end to the other longitudinal end of the sensor cable segment without connection to an electrode.

20. The method of claim 18, wherein the electromagnetic sensor cable further comprising cable components:
    a first through wire cable segment having electrical conductors extending from one longitudinal end to the other.

21. The method of claim 20 wherein the electromagnetic sensor cable further comprises at least one additional cable component selected from the group consisting of:
- a sensor cable segment configured substantially the same as the first sensor cable segment,
- a through wire cable segment configured substantially the same as the first through wire cable segment, and
- a signal processing and configuration module configured substantially the same as the first signal processing and configuration module.

22. The method of claim 21 wherein the cable components are connected at lateral ends such that the number of cable components between sensor cable segments progressively increases from a first end of the electromagnetic sensor cable to a second end of the electromagnetic sensor cable.

23. The method of claim 20 wherein the connection between cable components provides electrical connectivity between the electrical conductors of the sensor cable segments, the electrical conductors of the first through wire cable segment, and the signal processing circuitry of the first signal processing and configuration module.

24. The method of claim 18 wherein the signal processing and configuration module has a configuration plug which is electrically configurable to electrically connect at least two electrodes to the signal processing circuitry.

25. The method of claim 18 wherein the signal processing and configuration module includes a low noise amplifier in signal communication with the configuration plug, an analog to digital converter and an electrical to optical converter in electrical connection to the low noise amplifier.

26. The method of claim 18 wherein the first through wire cable segment provides electrical connections between a first cable component connected at a first lateral end of the first through wire cable segment and a second cable component connected at a second lateral end of the first through wire cable segment such that the electrical pathways are the same as if the first and second cable component were directly connected to each other.

27. The method of claim 18 further comprising:
measuring a voltage across a selected pair of electrodes, and
communicating a signal representative of the voltage across the selected pairs of electrodes.

28. The method of claim 27 further comprising:
using the signal to infer spatial distribution of electrical conductivity of rock formations below the body of water.

* * * * *